March 6, 1956  J. M. GOLDSTEIN  2,736,986
MINNOW TRAP
Filed Aug. 20, 1953
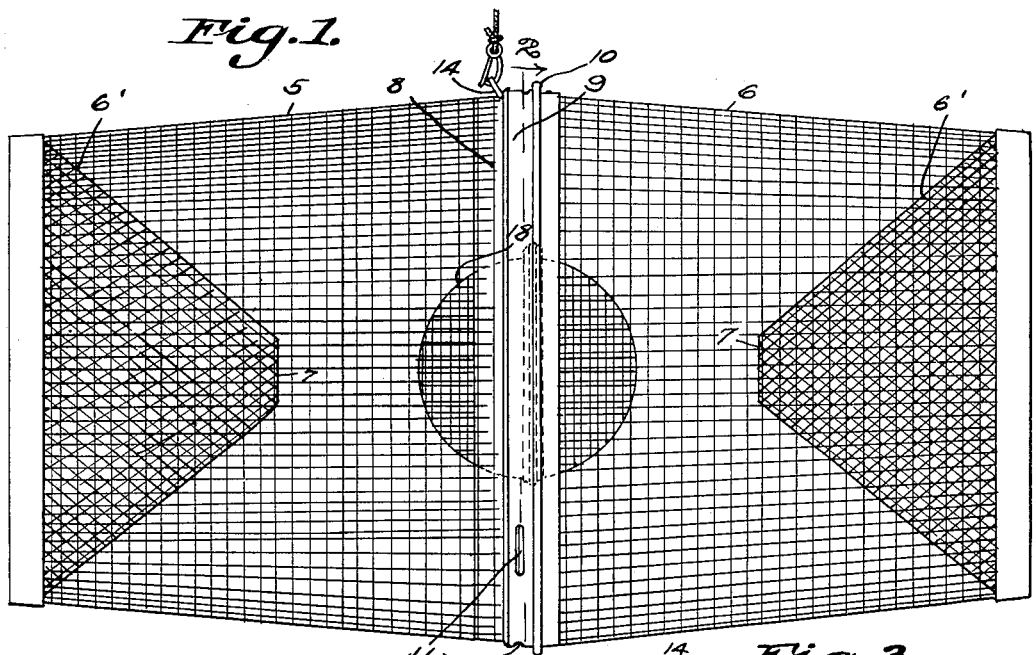
Jacob M. Goldstein
INVENTOR
BY C. A. Snow & Co.
ATTORNEYS.

United States Patent Office 2,736,986
Patented Mar. 6, 1956

2,736,986

MINNOW TRAP

Jacob M. Goldstein, Wilkes-Barre, Pa.

Application August 20, 1953, Serial No. 375,347

3 Claims. (Cl. 43—103)

This invention relates to minnow or fish traps, the primary object of the invention being to construct a minnow trap embodying removably connected sections held together in such a way that the connected ends of the wire mesh sections will be exceptionally strong and durable and braced against collapsing at their points of contact.

Another object of the invention is to provide a sectional minnow trap wherein wide bands or rims are provided at the large ends of frustoconical trap sections, which rims have interlocking means for securely holding the sections of the trap together under normal conditions.

Still another object of the invention is to provide a securing member in the form of an ear secured to the band or rim of one section, the band or rim of the cooperating section having a slot formed therein for the reception of such ear, which ear is supplied with an opening for the reception of a conventional clip for securing the sections together and at the same time affording means for attaching a supporting rope to the trap to hold the trap in its operating position.

With the foregoing and other objects in view which will appear as the decription proceeds, the invention consists of certain novel details of construction and combinations of parts hereinafter more full described and pointed out in the claims, it being understood that changes may be made in the construction and arrangement of parts without departing from the spirit of the invention as claimed.

Referring to the drawing:

Figure 1 is a side elevational view of a fish trap, constructed in accordance with the invention.

Fig. 2 is a sectional view taken on line 2—2 of Fig. 1.

Fig. 3 is a fragmental sectional view taken on line 3—3 of Fig. 2.

Fig. 4 is a sectional view taken on line 4—4 of Fig. 2.

Fig. 5 is a transverse sectional view along the line 5—5 in Fig. 2 taken through the sectional bait holder of the trap.

Referring to the drawing in detail, the trap embodies frusto-conical sections 5 and 6, the small end of each section being inturned providing conical entrances 6' which are also frusto-conical in shape so that fish may enter the sections of the trap, through the openings 7 formed at the inner ends of the frusto-conical entrances 6.

The large end of the frusto-conical section 5 is secured to the offset portion 8 of the band 9 which band has its free edge rolled outwardly, as better shown by Fig. 3 of the drawings.

The portions of the band 9 adjacent to the rolled edge 10, is formed with inwardly extended lugs 11 which are arranged therein and disposed in spaced relation with respect to each other.

The band 9 is also provided with a slot 12 at the point where the offset portion 8 merges into the main portion of the band 9.

The opposite frusto-conical section 6 is provided with a wide band or rim 13 which has its free edge portion 10 rolled outwardly for cooperation with the lugs 11 in holding the sections together, when the band of the section 6 has been inserted within the band of the section 5 in a manner as shown by Fig. 4 of the drawing.

An ear indicated by the reference character 14 is secured to the rim of the section 6, and extends forwardly therefrom, beyond the rolled edge of the section 6. This ear is formed with an opening 15 so that when the ear is extended through the slot 12 in a manner as shown by Fig. 3 of the drawing, the ear and opening afford means whereby a rope or chain may be attached to the trap for suspending the trap in a desired location.

Secured to the band 13 within the section 6, at the enlarged end thereof, are spring arms 16, the free ends of said arms 16 being formed into hooks 17 and 17' respectively, the arms 16 being disposed at diametrically opposite points within the section 6. These hooks 17 and 17' are for the purpose of supporting the food or bait holder 18 through the medium of the plastic bands 19 which are shown as positioned over hooks 20 that are carried by one section of the food or bait holder 18, the elastic bands being also positioned over the hooks 17 of said arms 16.

Due to this construction, it will be seen that the food or bait holder is held in a position in direct alignment with the entrance openings of the members 6, to attract fish thereto.

The food or bait holder 18 is constructed preferably of foraminous material and is shaped to provide a sphere made up of a pair of semispherical sections connected by hinge 17', said sections including bands 18' which are held together by means of the clip 21, so that the food or bait holder may be opened and the food or bait positioned therein, the sections of the food or bait holder being brought together housing the food or bait.

From the foregoing it will be seen that due to the construction shown and described, I have provided a sectional fish trap wherein the body portion of the trap is constructed of frusto-conical sections, the large ends of the sections being constructed to provide wide bands to which the wire mesh or foraminous material is secured, the band of one of the sections having an offset section against which the band of the cooperating section engages together with lugs carried by one of the bands for engagement with the band of the cooperating section in securing the sections together, the lugs snapping behind the rolled edge 10 of the section 6.

It will further be seen that because of the construction of the ear 14, the sections may be held together, the ear providing means for attaching a rope or chain to the trap for supsending the trap in a location for trapping fish.

Having thus described the invention, what is claimed is:

1. In a fish trap, a pair of frusto-conical trap sections having one of their respective end portions enlarged, said trap being constructed of foraminous material provided with bands secured within the large ends of the trap sections, said bands having rolled outer edges, one of said bands having a slot, an ear extending from the other section adapted to be positioned in said slot securing said sections together, and elongated lugs extending inwardly from the wide band of one section of the trap, said lugs adapted to move over said rolled edge of the cooperating trap sections providing further connecting means between said trap sections.

2. In a fish trap, a pair of frusto-conical trap sections constructed of wire mesh material, wide bands secured within the large ends of said trap sections, a rolled edge formed on one of said bands, an ear extending from the band having the rolled edge, the opposite band having an opening through which said ear extends securing the sections against rotation with respect to each other, and lugs extending inwardly from the band section having the opening, said lugs cooperating with said rolled edge in securing the sections of the trap in alignment with respect to each other.

3. In a fish trap, a pair of frusto-conical trap sections constructed of wire mesh material, wide bands secured within the large ends of said trap sections, a rolled edge formed on one said trap sections, an annular offset shoulder formed on one of the trap sections against which the rolled edge of the band of the other trap section engages, holding the trap sections against movement with respect to each other, and means for securing the trap sections together.

References Cited in the file of this patent

UNITED STATES PATENTS

| | | |
|---|---|---|
| 527,435 | Loud | Oct. 16, 1894 |
| 798,670 | Gee | Sept. 5, 1905 |
| 995,893 | Neitzel | June 20, 1911 |
| 1,136,635 | Weislowits | Apr. 20, 1915 |
| 1,231,034 | Love | June 26, 1917 |
| 1,441,967 | Crowel | Jan. 9, 1923 |